(12) United States Patent
Saito

(10) Patent No.: US 7,133,932 B2
(45) Date of Patent: Nov. 7, 2006

(54) SCHEDULING SYSTEM USING PACKET FIFOS AND CELL FIFOS FOR CONVERTING IP PACKETS TO ATM CELLS

(75) Inventor: Takashi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 723 days.

(21) Appl. No.: 09/865,219

(22) Filed: May 25, 2001

(65) Prior Publication Data

US 2001/0047425 A1  Nov. 29, 2001

(30) Foreign Application Priority Data

May 25, 2000  (JP)  ............................. 2000-154718

(51) Int. Cl.
*G06F 15/16* (2006.01)
(52) U.S. Cl. .................................... 709/246; 370/466
(58) Field of Classification Search ............... 709/236, 709/246; 370/395, 395.1, 252, 474, 394, 370/386, 235, 230, 395.6, 466
See application file for complete search history.

(56) References Cited

U.S. PATENT DOCUMENTS

| | | | | |
|---|---|---|---|---|
| 5,999,534 A | * | 12/1999 | Kim | ...................... 370/395.42 |
| 6,014,367 A | * | 1/2000 | Joffe | ......................... 370/230 |
| 6,249,511 B1 | * | 6/2001 | Kado | ......................... 370/232 |
| 6,522,667 B1 | * | 2/2003 | Oda et al. | .................... 370/474 |
| 6,556,567 B1 | * | 4/2003 | Murakami et al. | .......... 370/394 |
| 6,556,569 B1 | * | 4/2003 | Ogawa et al. | ........... 370/395.2 |
| 6,618,378 B1 | * | 9/2003 | Giroux et al. | ........... 370/395.1 |
| 6,628,652 B1 | * | 9/2003 | Chrin et al. | ................ 370/386 |
| 6,704,321 B1 | * | 3/2004 | Kamiya | ..................... 370/412 |
| 6,711,167 B1 | * | 3/2004 | Ikeda et al. | .............. 370/395.1 |
| 6,765,872 B1 | * | 7/2004 | Tazaki | ....................... 370/235 |
| 6,829,224 B1 | * | 12/2004 | Goldman et al. | ........... 370/252 |
| 6,907,001 B1 | * | 6/2005 | Nakayama et al. | ......... 370/230 |

* cited by examiner

*Primary Examiner*—Le Hien Luu
(74) *Attorney, Agent, or Firm*—Scully, Scott, Murphy & Presser, P.C.

(57) ABSTRACT

A scheduling circuit of the present invention includes an IP (Internet Protocol) scheduling/format converting section for scheduling input IP packets and converting each of them to ATM (Asynchronous Transfer Mode) cells. The IP scheduling/format converting section includes a plurality of packet FIFOs (First-In First-Out memories). The ATM cells output from each packet FIFO are written to corresponding one of a plurality of cell FIFOs. An ATM scheduling section schedules the ATM cells received from each cell FIFO cell by cell.

10 Claims, 5 Drawing Sheets

SCHEDULING SYSTEM USING PACKET FIFOS AND CELL FIFOS FOR CONVERTING IP PACKETS TO ATM CELLS

BACKGROUND OF THE INVENION

The present invention relates to a scheduling circuit and more particularly to a scheduling circuit applicable to an ATM (Asynchronous Transfer Mode) communication network.

Scheduling circuits for the above application are disclosed in, e.g., Japanese Patent Laid-Open Publication No. 11-340983 and a paper 2 "B-8-12", The Institute of Electronics, Information and Communication Engineers of Japan, 1999 General Meeting.

In a transmission network in which IP (Internet Protocol) is mapped and a communication terminal included therein, suitable delay is added at the output side of the apparatus on an IP packet or an ATM cell basis in accordance with traffic rates, which are dependent on notified values. The delay frees the network and a receiving terminal connected to the above terminal from excessive loads. In this case, a sequence of processing for smoothing the traffic, i.e., scheduling is essential for controlling data to be sent.

A conventional scheduling circuit includes an IP scheduling section, a format converting section, and an ATM scheduling section. The problem with such a conventional scheduling circuit is that both the IP scheduling section and ATM scheduling section discard a datagram. As a result, a datagram is discarded excessively, depending on the traffic.

SUMMARY OF THE INVENTION

It is therefore an object of the present invention to provide a reliable scheduling circuit capable of reducing the loss of cells as far as possible.

A scheduling circuit of the present invention includes an IP scheduling/format converting section for scheduling input IP packets and converting each of them to ATM cells. The IP scheduling/format converting section includes a plurality of packet FIFOs (First-In First-Out memories). The ATM cells output from each packet FIFO are written to corresponding one of a plurality of cell FIFOs. An ATM scheduling section schedules the ATM cells received from each cell FIFO cell by cell.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, brief reference will be made to a conventional scheduling circuit, shown in FIG. 1. As shown, the scheduling circuit is generally made up of an IP scheduling section 41, a format converting section 42, and an ATM scheduling section 43. The IP scheduling section 41 schedules IP packets. The format converting section 42 converts the format of the IP packets output from the IP scheduling section 41 to the format of ATM cells. The ATM scheduling section 43 performs scheduling on a cell basis. When any cell cannot be scheduled in the ATM scheduling section 43, the section 43 discards the cell, determining that congestion has occurred in a corresponding VCI (Virtual Channel Identifier).

The problem with the conventional scheduling circuit is that both the IP scheduling section 41 and ATM scheduling section 43 discard a datagram and are therefore apt to discard it excessively, as stated earlier. This problem will be described more specifically with reference to FIG. 5.

Figure 1:
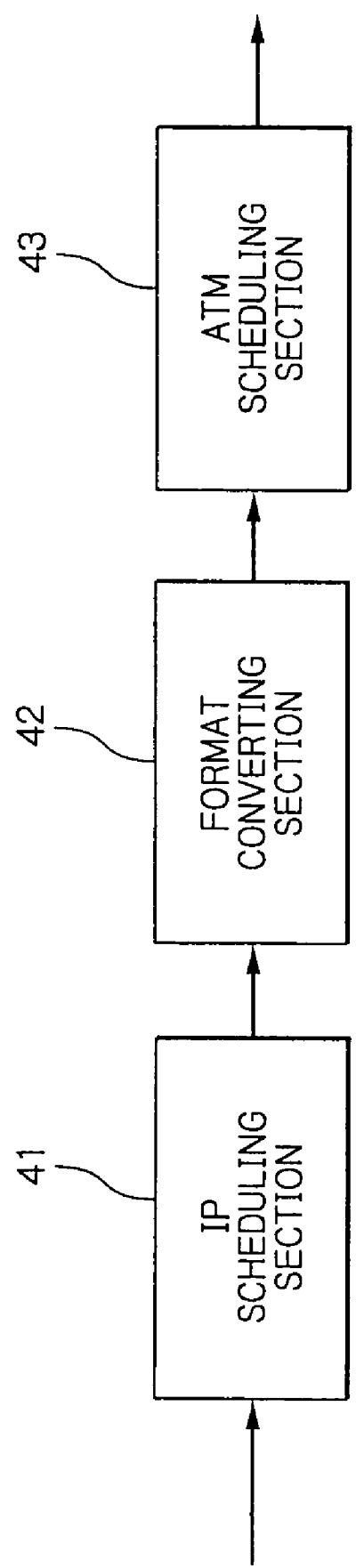
FIG. 1 is a block diagram schematically showing a conventional scheduling circuit.
Figure 2:
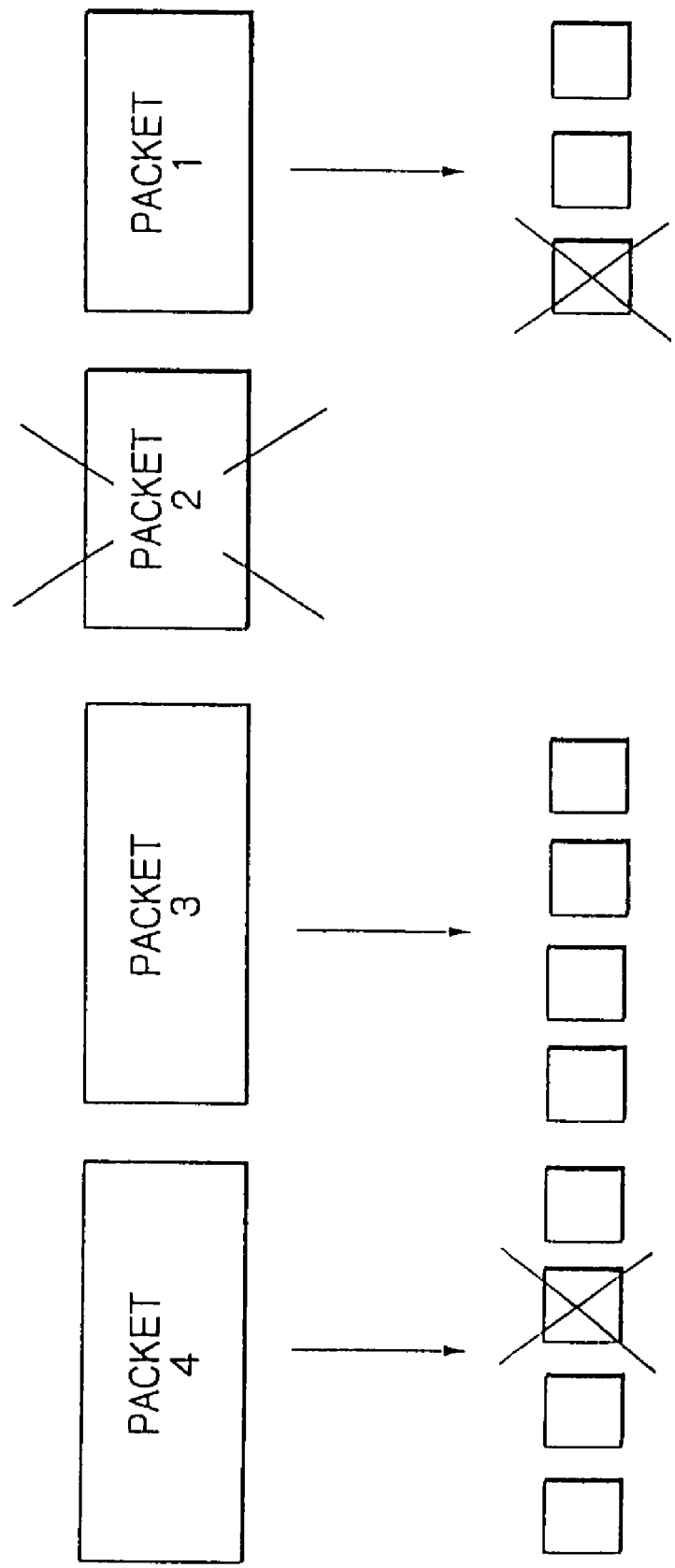
FIG. 2 demonstrates the operation of the conventional scheduling circuit by using a specific datagram.

As shown in FIG. 2, assume that four consecutive packets #1, #2, #3 and #4 respectively having cell lengths of 3, 2, 4 and 4 are input to the IP scheduling section 41, FIG. 1. Also, assume that the IP scheduling section 41 discards the packet #2 due to overflow as a result of scheduling, as indicated by a cross. Then, the format converting section 42 divides the scheduled packets #1, #3 and #4 to three ATM cells, four ATM cells and four ATM cells respectively. Further, assume that the ATM scheduling section 43 discards one of the cells derived form the packet #1 and one of the cells derived from the packet #4. As a result, one whole packet and two cells are discarded in total, as indicated by crosses in FIG. 1. In this condition, a receiving terminal cannot reconstruct the IP packet #1 or #4 due to the incomplete cells. That is, only the IP packet #3 can be transferred to a receiving terminal.

Figure 3:
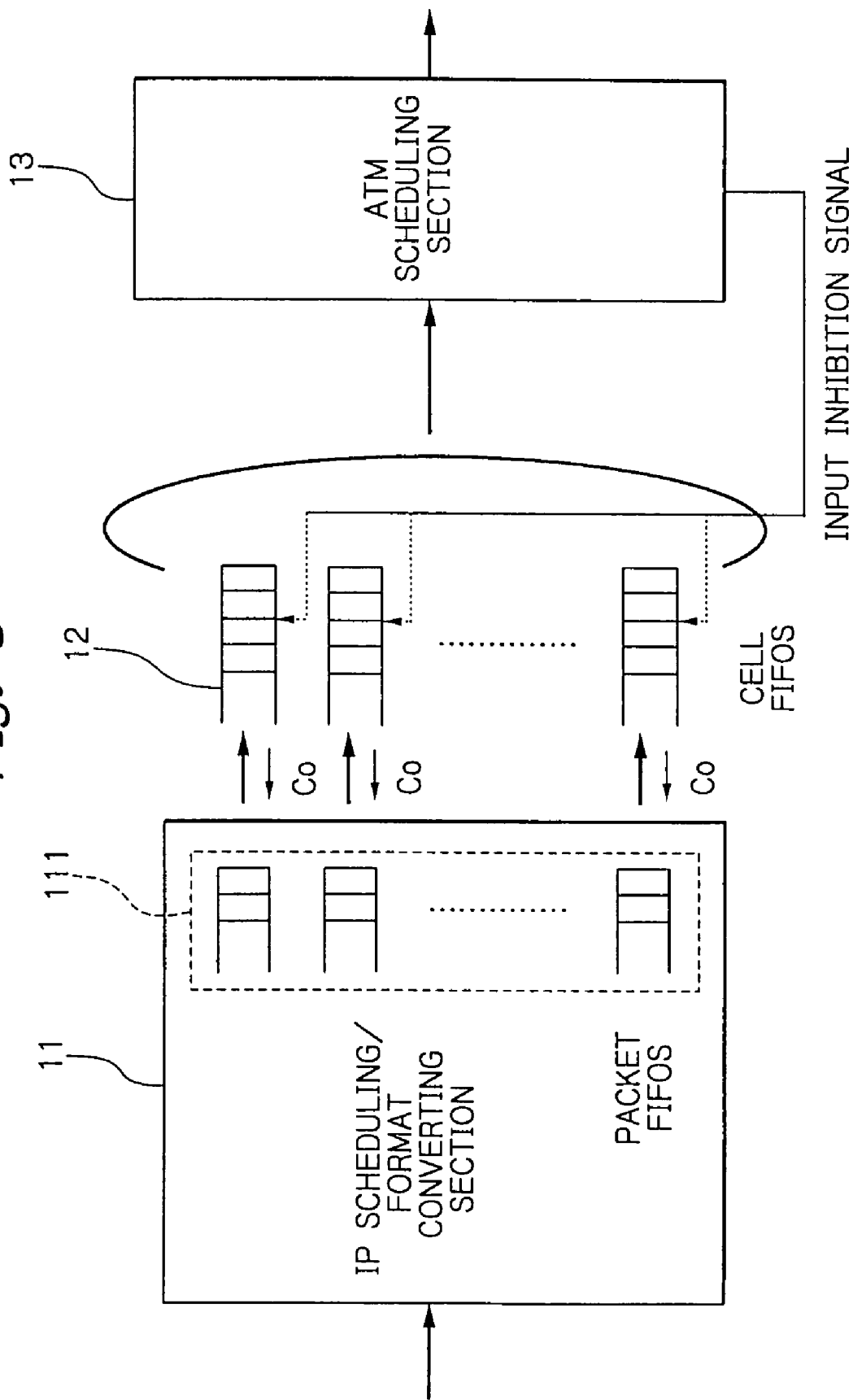
FIG. 3 is a schematic block diagram showing a scheduling circuit embodying the present invention.

Referring to FIG. 3, a scheduling circuit embodying the present invention will be described. As shown, the scheduling circuit is generally made up of an IP scheduling/format converting section 11, cell FIFOs (First-In First-Out memories) 12, and an ATM scheduling section 13. The IP scheduling/format converting section 11 includes packet FIFOs 111.

The IP scheduling/format converting section 11 schedules IP packets sequentially input from a communication apparatus, in which the scheduling circuit is installed, and then converts them to ATM cells. Specifically, the IP scheduling/format converting section 11 includes a scheduling section and a format converting section although not shown specifically. The scheduling section schedules the IP packets on a packet basis. The format converting section maps the scheduled IP packets into ATM cells having VCI numbers assigned by a network operator and then performs queuing on a VCI basis. For this purpose, the packet FIFOs 111 each are allotted to a particular VCI. The IP packets stored in the respective FIFO 111 each are divided into ATM cells and then written to associated one of the cell FIFOs 12. The cells written to the cell FIFO 12 are delivered to the ATM scheduling section 13 one by one by the conventional round robin algorithm. The ATM scheduling section 13 schedules the input cells on a cell basis.

Specifically, while the ATM scheduling section 13 schedules a given cell, it calculates a logical transmission time for the next cell belonging to the same VCI as the above cell. The ATM scheduling section 13 then determines, based on the calculated time, whether or not it can schedule the next cell. If the ATM scheduling section cannot schedule the next cell, then it delivers an input inhibition signal to the cell FIFO 12 from which the given cell has been output, thereby preventing the cell FIFO 12 from outputting the next cell. Stated another way, the ATM scheduling section 13 executes back pressure control with the VCI to which the above cell belongs in order to avoid cell-by-cell discard.

The cell FIFOs 12 each deliver the cells to the ATM scheduling section 13 one by one. On delivering all the cells derived from a single IP packet, each cell FIFO 12 feeds a control signal Co to the IP scheduling/format converting section 11, requesting it to output the next IP packet. When any one of the packet FIFOs 111 overflows, the IP scheduling/format converting section 11 discards packets on a packet basis.

Figure 4:
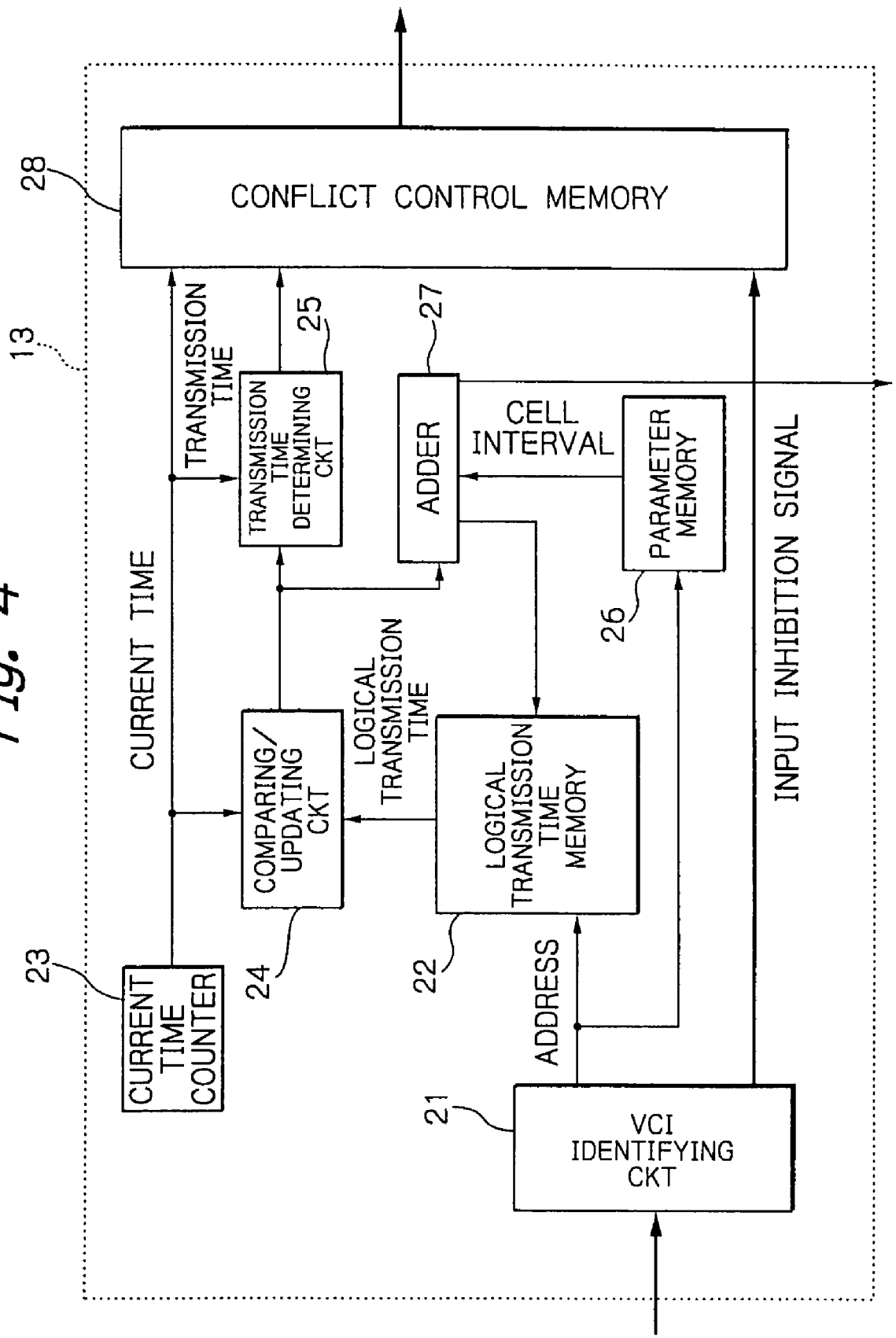
FIG. 4 is a schematic block diagram showing a specific configuration of an ATM scheduling section included in the illustrative embodiment.

Reference will be made to FIG. 4 for describing a specific configuration of the ATM scheduling section 13. As shown, the ATM scheduling section 13 includes a VCI identifying circuit 21, a logical transmission time memory 22, a current time counter 23, a comparing/updating circuit 24, a transmission time determining circuit 25, a parameter memory 26, an adder 27, and a conflict control memory 28.

In operation, when an ATM cell is fed from the communication apparatus to the ATM scheduling section 13, the VCI identifying circuit 21 references a header attached to the cell so as to identify a VCI to which the cell belongs. The logical transmission time memory 22 stores, as a parameter, a time at which each cell having a particular VCI number in its header should be sent, thereby managing logical transmission times on a VCI basis. More specifically, VCI numbers and logical transmission times are respectively the addresses and data of the memory 22. The VCI identifying circuit 21 feeds the identified VCI to the memory 22. As a result, a logical transmission time corresponding to the VCI is read out of the memory 22 and fed to the comparing/updating circuit 24.

The comparing/updating circuit 24 compares the current time of the arrived cell output from the current time counter 23 and the logical transmission time. If the current time is later than the logical transmission time, then the comparing/updating circuit 24 updates the logical transmission time with the current time. More specifically, the fact that the current time is later than the logical transmission time is equivalent to a condition wherein the arrival traffic of the VCI corresponding to the cell is lighter than a notified value. It is therefore necessary to schedule cells expected to arrive by using the above arrival time as a reference.

The transmission time determining circuit 25 determines a time for sending the subject cell on the basis of the logical transmission time output from the comparing/updating circuit 24. The time determined by the determining circuit 25 is input to the conflict control memory 28. That is, the determining circuit 25 writes the cell received from the VCI identifying circuit 21 in the conflict control member 28 by using the time as an address. The conflict control memory 28 has addresses implemented as the transmission times of individual cells and stores cells as data.

More specifically, the transmission determining circuit 25 compares the logical transmission time output from the comparing/updating circuit 24 and the time of arrival of the cell. If the time of arrival is earlier than the logical transmission time, the determining circuit 25 determines a transmission time such that the cell will be sent at the logical transmission time. This realizes scheduling according to a notified rate.

The adder 27 adds the logical transmission time output from the comparing/updating circuit 24 and a cell interval read out of the parameter memory 26, thereby determining a time for sending the next cell belonging to the same VCI as the subject VCI. Specifically, the parameter memory 26 stores cell intervals, or transmission intervals that are the reciprocals of VCI-by-VCI notified rates set by a network operator beforehand. The parameter memory 26 allows the adder 27 to reference the cell intervals by using the VCI number as an address.

The cells written to the conflict control memory 28 are sequentially sent on the basis of the transmission times determined by the transmission time determining circuit 25. More specifically, the conflict control memory 28 temporarily stores each cell until a transmission time assigned thereto by the transmission time determining circuit 25. If the logical transmission time to be added by the adder 27 exceeds a time that the conflict control member 28 can deal with, then the ATM scheduling section 13 determines that congestion has occurred within the communication apparatus. In this case, the ATM scheduling section 13 delivers an input inhibition signal to the cell FIFO 12, which has outputted the cell.

Figure 5:
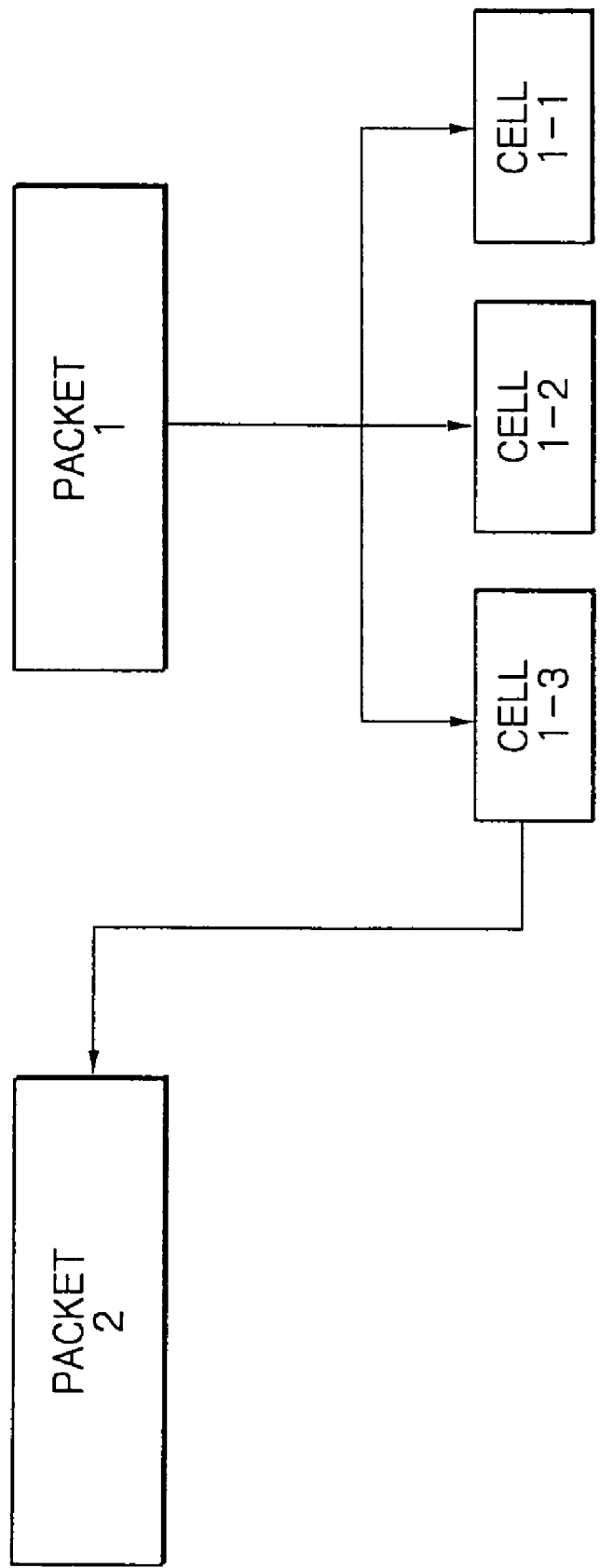
FIG. 5 demonstrates the operation of the illustrative embodiment by using a specific datagram.

The operation of the illustrative embodiment will be described by using a specific datagram shown in FIG. 5. As shown, assume that a packet 1 input to the scheduling circuit is divided into three cells 1-1, 1-2 and 1-3 by format conversion. Also, assume that while the transmission times of the cells 1-1 and 1-2 are determined by the ATM scheduling section 13, FIG. 3, but the cell 1-3 cannot be scheduled, i.e., the logical transmission time of the cell 1-3 cannot be scheduled at the determined transmission time of the cell 1-2. Then, the ATM scheduling section 13 delivers an input inhibition signal to the FIFO 12 output the cells 1-1 through 1-3, causing the FIFO 12 to hold the cell 1-3 until vacancy occurs in the memory.

Each cell FIFO 12 feeds the previously mentioned control signal Co to the IP scheduling/format converting section 11 when all the cells of a packet are fully scheduled, i.e., when the entire FIFO 12 becomes idle. Consequently, the IP packet 2 shown in FIG. 5 is left in the packet FIFO 111 corresponding to the above cell FIFO 12 and delayed thereby. The IP packet 2 is therefore divided into cells after the cell 1-3 has become able to be scheduled.

In summary, in accordance with the present invention, a scheduling circuit executes, when an ATM scheduling section detects congestion, back pressure control with an IP-to-ATM format converting section. The scheduling circuit therefore discards a datagram on an IP packet basis, i.e., obviates discard on an ATM cell basis. This allows a receiving terminal to reconstruct IP packets at a high ratio and thereby realizes a communication network having a high IP packet throughput.

Various modifications will become possible for those skilled in the art after receiving the teachings of the present disclosure without departing from the scope thereof.

What is claimed is:

1. A scheduling circuit comprising:

an IP (Internet Protocol) scheduling/format converting section for scheduling input IP packets and converting each of said IP packet to ATM (Asynchronous Transfer Mode) cells, said IP scheduling/format converting section sequentially schedules said IP packets on a packet basis, said IP scheduling/format converting section includes a plurality of packets FIFOs (First-In First-Out memories) for storing said scheduled IP packets, said IP scheduling/format converting section maps said scheduled IP packets into said ATM cells having a VCI number;

a plurality of cells FIFOs to each of which the ATM cells output from a corresponding one of said plurality of packet FIFOs are written; and an ATM scheduling section for scheduling the ATM cells received from each of said cell FIFOs cell by cell.

2. The scheduling circuit as claimed in claim 1, wherein said ATM scheduling section calculates, while scheduling a given cell belonging to a given VCI (Virtual Channel Identifier), a logical transmission time for a next cell belonging to a given VCI (Virtual Channel Identifier) and sends, if next cell cannot be scheduled, an input inhibition signal to one of said plurality of cell FIFOs that has output said given cell.

3. The scheduling circuit as claimed in claim 2, wherein when any one of said plurality of packet FIFOs overflows, aid IP scheduling/format converting section discards an entire packet.

4. The scheduling circuit as claimed in claim 3, wherein said ATM scheduling section comprises a VCI identifying circuit for identifying the VCI of each ATM cell by referencing a header attached to said ATM cell.

5. The scheduling circuit as claimed in claim 4, wherein said ATM scheduling section further comprises:
a logical transmission time memory for managing VCI numbers on the basis of a period of time;
a current time counter for outputting a current time;
a comparing/updating circuit for comparing the current time of an arrived cell and the logical transmission time;
a transmission time determining circuit for determining a transmission time of the cell; and
a conflict control memory for sending, in response to an output of said VCI identifying circuit, the ATM cell scheduled in accordance with the current time output from said current time counter and the transmission time determined by said transmission time determining circuit.

6. The scheduling circuit as claimed in claim 1, wherein said ATM scheduling section comprises a VCI identifying circuit for identifying the VCI of each ATM cell by referencing a header attached to said ATM cell.

7. The scheduling circuit as claimed in claim 6, wherein said ATM scheduling section further comprises:
a logical transmission time memory for managing VCI numbers on the basis of a period of time:
a current time counter for outputting a current time;
a comparing/updating circuit for comparing the current time of an arrived cell and the logical transmission time;
a transmission time determining circuit for determining a transmission time of the cell; and
a conflict control memory for sending, in response to an output of said VCI identifying circuit, the ATM cell scheduled in accordance with the current time output from said current time counter and the transmission time determined by said transmission time determining circuit.

8. The scheduling circuit as claimed in claim 1, wherein when any one of said plurality of packet FIFOs overflows, said IP scheduling/format converting section discards an entire packet.

9. The scheduling circuit as claimed in claim 8, wherein said ATM scheduling section comprises a VCI identifying circuit for identifying the VCI of each ATM cell by referencing a header attached to said ATM cell.

10. The scheduling circuit as claimed in claim 9, wherein said ATM scheduling section further comprises:
a logical transmission time memory for managing VCI numbers on the basis of a period of time;
a current time counter for outputting a current time;
a comparing/updating circuit for comparing the current time of an arrived cell and the logical transmission time;
a transmission time determining circuit for determining a transmission time of the cell; and
a conflict control memory for sending, in response to an output of said VCI identifying circuit, the ATM cell scheduled in accordance with the current time output from said current time counter and the transmission time determining circuit.

* * * * *